US012566566B2

(12) United States Patent
Yang et al.

(10) Patent No.: US 12,566,566 B2
(45) Date of Patent: Mar. 3, 2026

(54) SSD SYSTEM WITH CONSISTENT READ PERFORMANCE

(71) Applicant: SANDISK TECHNOLOGIES, INC., Milpitas, CA (US)

(72) Inventors: Niles Yang, Mountain View, CA (US); Daniel J Linnen, Naperville, IL (US); Piyush Dhotre, San Jose, CA (US); Adam Jacobvitz, San Jose, CA (US)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 29 days.

(21) Appl. No.: 18/224,405

(22) Filed: Jul. 20, 2023

(65) Prior Publication Data

US 2025/0028475 A1     Jan. 23, 2025

(51) Int. Cl.
*G06F 3/06* (2006.01)

(52) U.S. Cl.
CPC .......... *G06F 3/0653* (2013.01); *G06F 3/0659* (2013.01); *G06F 3/0607* (2013.01); *G06F 3/0619* (2013.01)

(58) Field of Classification Search
CPC .... G06F 3/0653; G06F 3/0659; G06F 3/0607; G06F 3/0619
See application file for complete search history.

(56) References Cited

U.S. PATENT DOCUMENTS

| | | | |
|---|---|---|---|
| 9,971,530 | B1 | 5/2018 | Yang |
| 10,564,895 | B2 | 2/2020 | Wu |
| 10,698,610 | B2 | 6/2020 | Yang |
| 2004/0006719 | A1* | 1/2004 | Kuo ...................... G06F 1/3203 713/300 |
| 2019/0034114 | A1 | 1/2019 | Natarajan |
| 2022/0083280 | A1 | 3/2022 | Su |
| 2022/0084567 | A1 | 3/2022 | Nair |
| 2022/0301598 | A1 | 9/2022 | Eemani |
| 2022/0334746 | A1 | 10/2022 | Cho |
| 2022/0334754 | A1* | 10/2022 | Hu ........................... G06F 3/064 |
| 2022/0365505 | A1 | 11/2022 | Yum |
| 2023/0147294 | A1 | 5/2023 | Sreedhar |
| 2024/0176506 | A1* | 5/2024 | Redaelli ................ G06F 3/0619 |
| 2024/0264753 | A1* | 8/2024 | Coppola ............... G06F 3/0625 |

FOREIGN PATENT DOCUMENTS

CN             110765042 A       2/2020

* cited by examiner

*Primary Examiner* — Jane W Benner
(74) *Attorney, Agent, or Firm* — Arlene Neal; NEAL BLIBO LLC

(57) ABSTRACT

A storage device may ensure consistent performance when executing a read command provided by a host device. The storage device executes a read instruction received from the host device and executes a background operation to manage resources on a memory device and/or perform thermal throttling on the storage device. The storage device executes a formula including an interleave ratio to interleave host read operations with the background operation based on an operation time. The storage device also uses a read temperature threshold, a preset slowdown percentage, and/or a read speed to optimize host read operations during thermal throttling and thereby limit performance degradation during read operations.

13 Claims, 8 Drawing Sheets

100

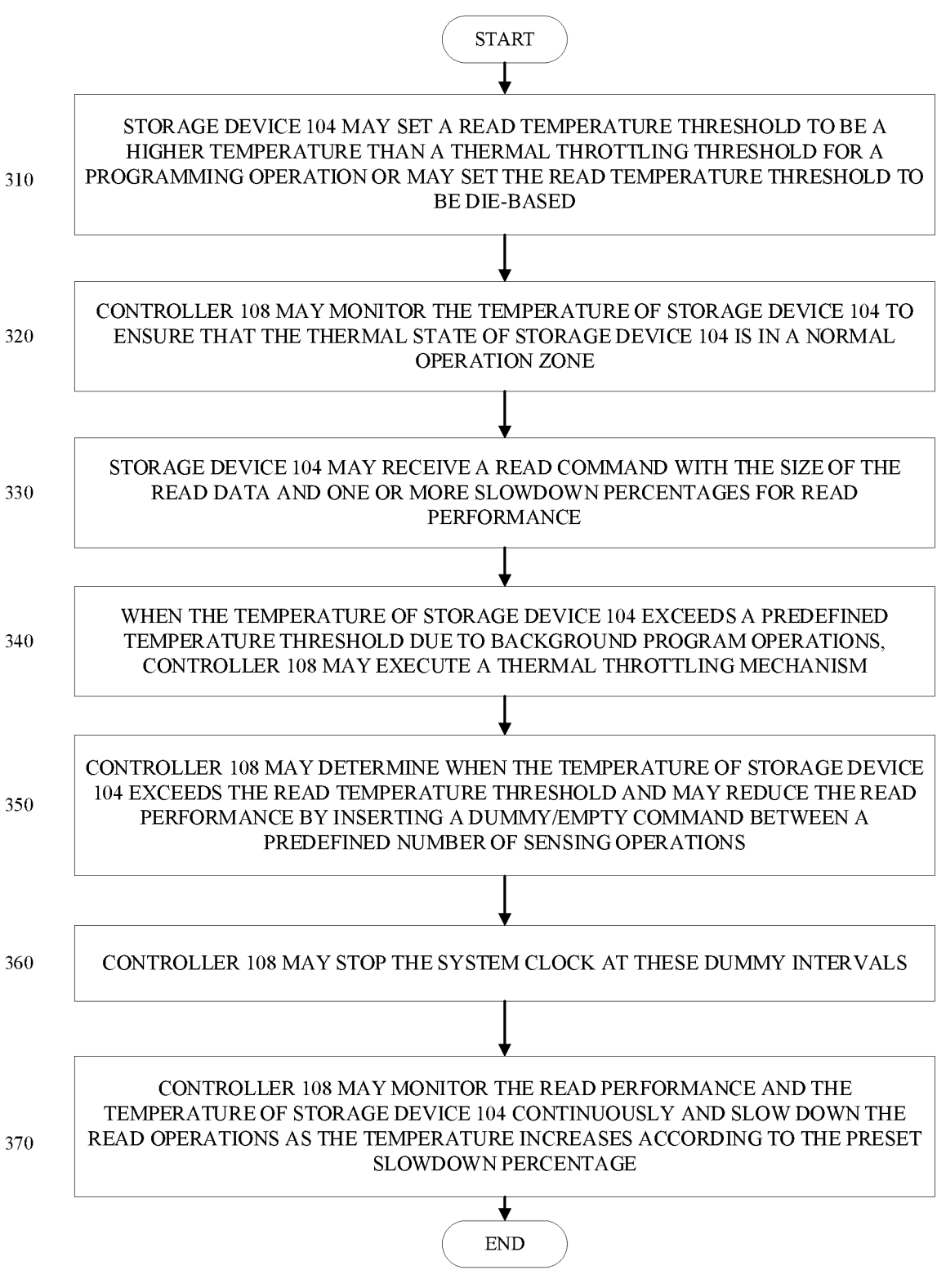

START

310  STORAGE DEVICE 104 MAY SET A READ TEMPERATURE THRESHOLD TO BE A HIGHER TEMPERATURE THAN A THERMAL THROTTLING THRESHOLD FOR A PROGRAMMING OPERATION OR MAY SET THE READ TEMPERATURE THRESHOLD TO BE DIE-BASED

320  CONTROLLER 108 MAY MONITOR THE TEMPERATURE OF STORAGE DEVICE 104 TO ENSURE THAT THE THERMAL STATE OF STORAGE DEVICE 104 IS IN A NORMAL OPERATION ZONE

330  STORAGE DEVICE 104 MAY RECEIVE A READ COMMAND WITH THE SIZE OF THE READ DATA AND ONE OR MORE SLOWDOWN PERCENTAGES FOR READ PERFORMANCE

340  WHEN THE TEMPERATURE OF STORAGE DEVICE 104 EXCEEDS A PREDEFINED TEMPERATURE THRESHOLD DUE TO BACKGROUND PROGRAM OPERATIONS, CONTROLLER 108 MAY EXECUTE A THERMAL THROTTLING MECHANISM

350  CONTROLLER 108 MAY DETERMINE WHEN THE TEMPERATURE OF STORAGE DEVICE 104 EXCEEDS THE READ TEMPERATURE THRESHOLD AND MAY REDUCE THE READ PERFORMANCE BY INSERTING A DUMMY/EMPTY COMMAND BETWEEN A PREDEFINED NUMBER OF SENSING OPERATIONS

360  CONTROLLER 108 MAY STOP THE SYSTEM CLOCK AT THESE DUMMY INTERVALS

370  CONTROLLER 108 MAY MONITOR THE READ PERFORMANCE AND THE TEMPERATURE OF STORAGE DEVICE 104 CONTINUOUSLY AND SLOW DOWN THE READ OPERATIONS AS THE TEMPERATURE INCREASES ACCORDING TO THE PRESET SLOWDOWN PERCENTAGE

END

FIG. 3

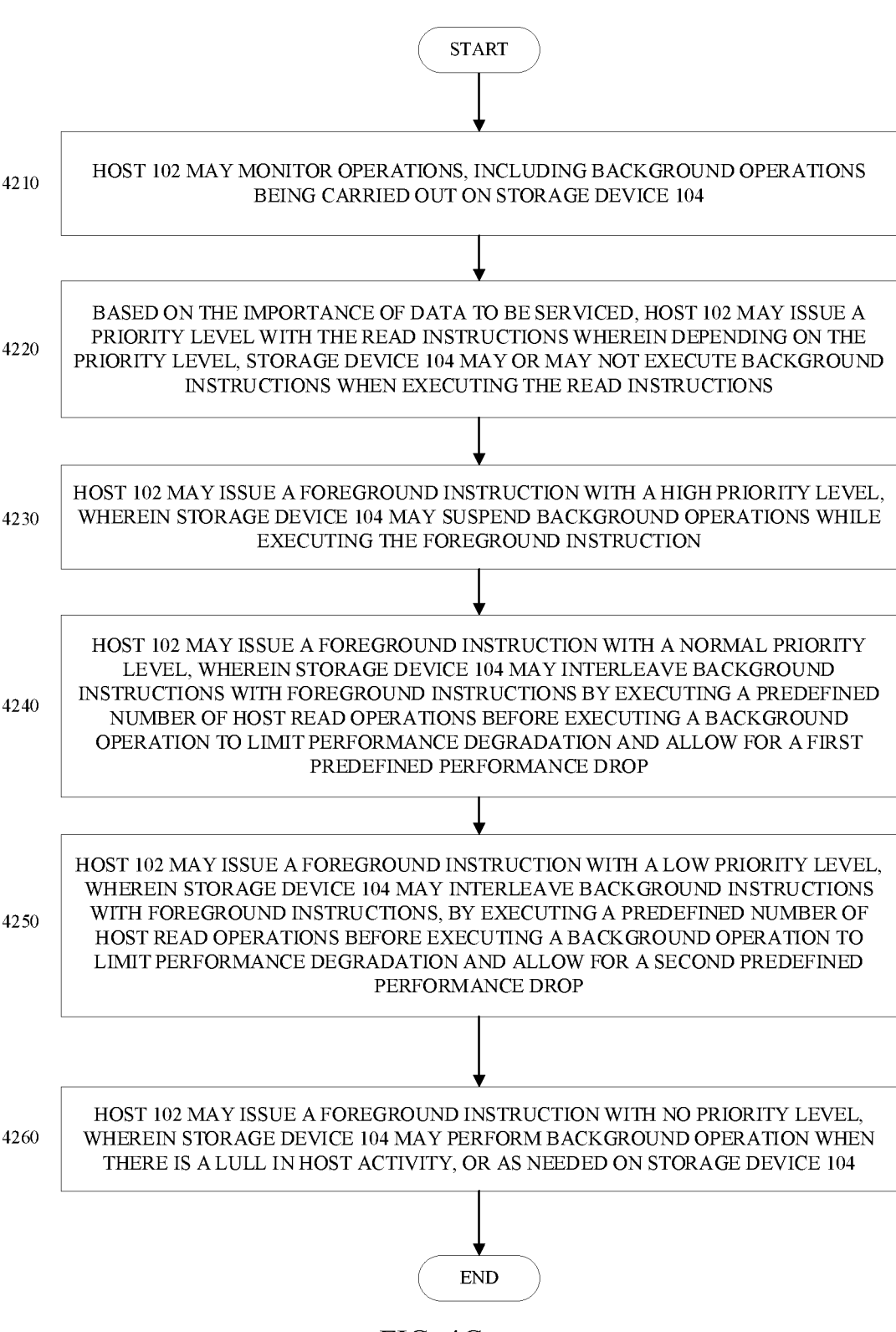

START

4210    HOST 102 MAY MONITOR OPERATIONS, INCLUDING BACKGROUND OPERATIONS
        BEING CARRIED OUT ON STORAGE DEVICE 104

4220    BASED ON THE IMPORTANCE OF DATA TO BE SERVICED, HOST 102 MAY ISSUE A
        PRIORITY LEVEL WITH THE READ INSTRUCTIONS WHEREIN DEPENDING ON THE
        PRIORITY LEVEL, STORAGE DEVICE 104 MAY OR MAY NOT EXECUTE BACKGROUND
        INSTRUCTIONS WHEN EXECUTING THE READ INSTRUCTIONS

4230    HOST 102 MAY ISSUE A FOREGROUND INSTRUCTION WITH A HIGH PRIORITY LEVEL,
        WHEREIN STORAGE DEVICE 104 MAY SUSPEND BACKGROUND OPERATIONS WHILE
        EXECUTING THE FOREGROUND INSTRUCTION

4240    HOST 102 MAY ISSUE A FOREGROUND INSTRUCTION WITH A NORMAL PRIORITY
        LEVEL, WHEREIN STORAGE DEVICE 104 MAY INTERLEAVE BACKGROUND
        INSTRUCTIONS WITH FOREGROUND INSTRUCTIONS BY EXECUTING A PREDEFINED
        NUMBER OF HOST READ OPERATIONS BEFORE EXECUTING A BACKGROUND
        OPERATION TO LIMIT PERFORMANCE DEGRADATION AND ALLOW FOR A FIRST
        PREDEFINED PERFORMANCE DROP

4250    HOST 102 MAY ISSUE A FOREGROUND INSTRUCTION WITH A LOW PRIORITY LEVEL,
        WHEREIN STORAGE DEVICE 104 MAY INTERLEAVE BACKGROUND INSTRUCTIONS
        WITH FOREGROUND INSTRUCTIONS, BY EXECUTING A PREDEFINED NUMBER OF
        HOST READ OPERATIONS BEFORE EXECUTING A BACKGROUND OPERATION TO
        LIMIT PERFORMANCE DEGRADATION AND ALLOW FOR A SECOND PREDEFINED
        PERFORMANCE DROP

4260    HOST 102 MAY ISSUE A FOREGROUND INSTRUCTION WITH NO PRIORITY LEVEL,
        WHEREIN STORAGE DEVICE 104 MAY PERFORM BACKGROUND OPERATION WHEN
        THERE IS A LULL IN HOST ACTIVITY, OR AS NEEDED ON STORAGE DEVICE 104

END

SSD SYSTEM WITH CONSISTENT READ PERFORMANCE

BACKGROUND

Non-volatile storage devices, such as solid-state drives (SSD) and the like, may include one or more memory devices for storing data and a controller for managing the internal operations of the storage device. The controller may process foreground operations including, for example, executing instructions such as data read and/or write instructions received from a host. The controller may also process background operations including, for example, executing internal operations to manage the resources on the storage device. In managing the resources of the storage device, the controller may execute relocation functions including compaction, read scrubbing, wear leveling, garbage collection, and the like, to move data from one location to another on the memory device, optimize how space on the memory device is used, and improve efficiency. To ensure that the storage device executes both background and foreground operations, some storage devices may interleave the background operations with the host read/write instructions. Interleaving background and foreground operations may degrade the storage device's response to the host instructions.

The controller may also monitor the temperature on the storage device to ensure that the thermal state of the storage device is in a normal operation zone where the highest performance may be provided as defined in the storage device specification. When the temperature of the storage device exceeds a normal operating temperature threshold, the controller may execute one or more thermal throttling algorithms to bring the temperature below the normal operating temperature threshold. If the controller is unsuccessful in reducing the temperature and the temperature rises above a predefined thermal shutdown threshold, the controller may determine that the storage device is in a thermal shutdown zone. In the thermal shutdown zone, the storage device may move to a shutdown state with no active components, wherein, normal operations may be denied to the host.

In some current implementations, if the temperature of the storage device is below the thermal shutdown threshold but at a predefined threshold above the normal operating temperature threshold, the controller may prevent the storage device from entering the thermal shutdown zone by slowing down execution of the host instructions by a predefined percentage. For example, if the temperature of the storage device is above 83° Celsius (C), the controller may slow down the execution of host instructions by 50% and if the temperature of the storage device is above 85° C., the controller may slow down the execution of host instructions by 75%. Slowing down the execution of host instructions to mitigate thermal issues may also degrade the storage device's response to the host instructions. Executing background instructions and thermal throttling algorithms may thus result in inconsistent performance levels from the storage device in response to host instructions.

In some instances, when the host transmits instructions to read data from the memory device, the host may require consistent read performance from the storage device. For example, when the host transmits instructions to read data from the memory device in a gaming mode, a computational mode, or when streaming from a data center, the host may require consistent read performance from the storage device. Despite this requirement, when the controller executes internal background operations, such as garbage collection and relocation functions, and high temperature-induced thermal throttling, the host may experience performance variations from the storage device.

SUMMARY

In some implementations, the storage device ensures consistent performance when executing a read command provided by a host device that is communicatively coupled to the storage device. The storage device is also communicatively coupled to a memory device including data in the read command. The storage device includes a controller to execute a read instruction received by the storage device and execute a background operation to at least one of manage resources on the memory device and perform thermal throttling on the storage device. The controller executes a formula including an interleave ratio to interleave host read operations with the background operation based on an operation time. The controller also uses a read temperature threshold, a preset slowdown percentage, and/or a read speed to optimize host read operations during thermal throttling and thereby limit performance degradation during read operations.

In some implementations, the storage device may receive a read instruction from the host, wherein the host monitors operations, being carried out on the storage device. The storage device may also receive instructions from the host to suspend background operations and to execute the read instruction. The storage device may suspend background operation until a predefined resumption condition occurs. The storage device may transmit a signal to the host when the resumption condition occurs and may resume processing the background operation based on a resumption instruction from the host.

In some implementations, a method is provided to ensure consistent performance when executing a read command provided by a host device that is communicatively coupled to a storage. The method includes executing a read instruction received by the storage device from the host device. The method also includes executing, by the storage device, a background operation to at least one of manage resources on the memory device and perform thermal throttling on the storage device. The method also includes executing a formula including an interleave ratio to interleave host read operations with the background operation based on an operation time. The method further includes using a read temperature threshold, a preset slowdown percentage, and/or a read speed to optimize host read operations during thermal throttling and thereby limit performance degradation during read operations.

BRIEF DESCRIPTION OF THE SEVERAL VIEWS OF THE DRAWINGS

FIG. 3 is a flow diagram of an example process for ensuring consistent read performance on a storage device implementing thermal throttling in accordance with some implementations.

FIGS. 4A-4C are flow diagrams of example processes for ensuring consistent read performance by a host device transmitting read instructions to a storage device in accordance with some implementations.

Figure 1:
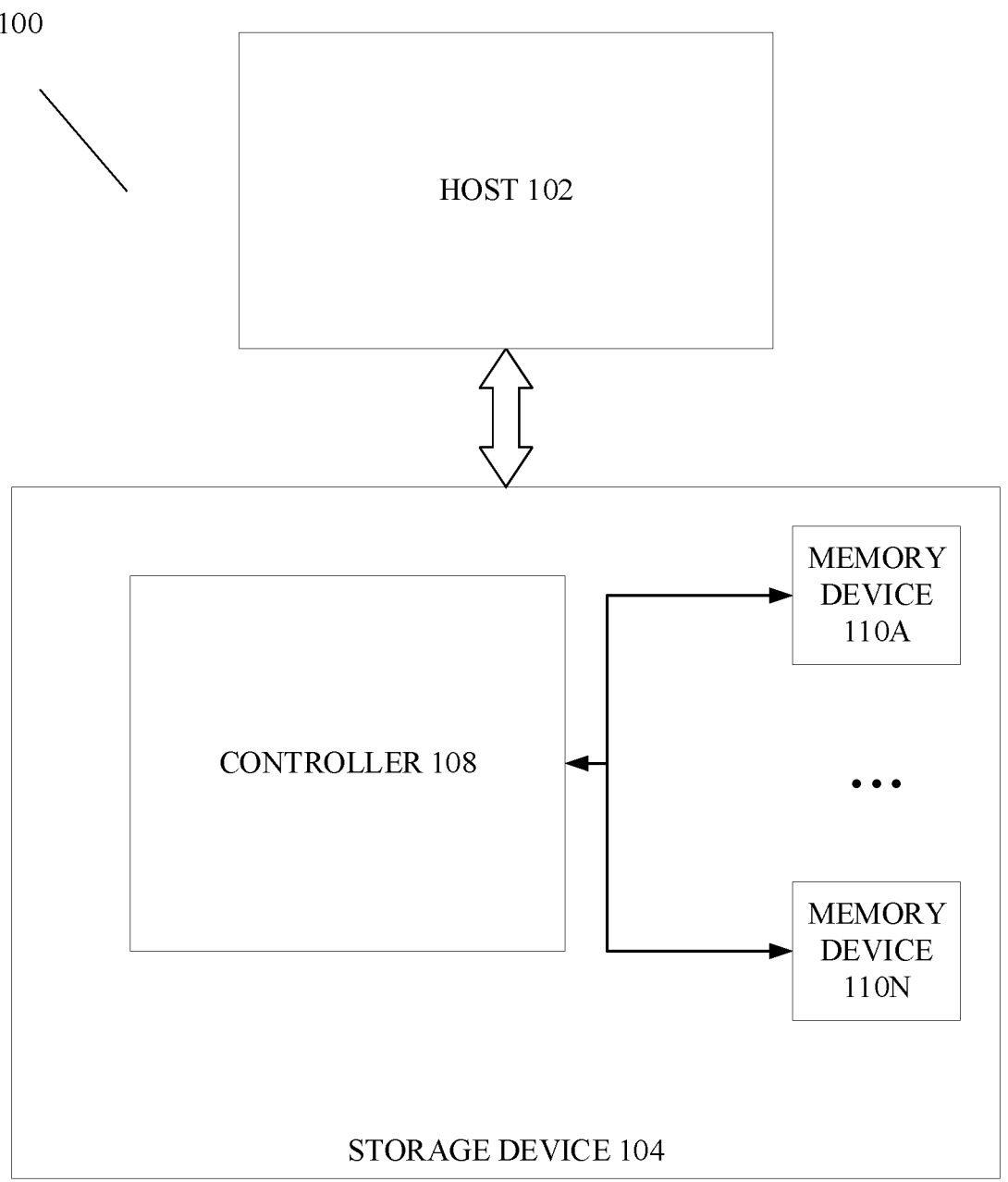
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 and one or more memory devices 110a-110n (referred to herein as memory device(s) 110). Storage device 104 may be, for example, a solid-state drive (SSD), and the like. Memory device 110 may be flash based, including, for example, NAND flash memory. Memory device 110 may be included in storage device 104 or may be otherwise communicatively coupled to storage device 104.

Controller 108 may execute background operations to manage resources on memory device 110. For example, controller 108 may monitor memory device 110 and may execute garbage collection and other relocation functions per internal relocation algorithms to refresh and/or relocate the data on memory device 110. Typically, in performing a relocation/background operation, controller 108 may perform a test read operation on data stored on memory device 110 and controller 108 may relocate data stored on memory device 110 in response to the test read. In relocating the data, controller 108 may perform a program operation to read the data from a first block and write/program the data on a second block on memory device 110. Controller 108 may take approximately 2000 microseconds (μs) to perform the program operation.

Controller 108 may also execute foreground operations to process instructions transmitted from host 102. For example, controller 108 may read data from and/or write data to memory device 110 based on instructions received from host 102. Controller 108 may take about 60 μs to read data from memory device 110. To execute background operations while processing foreground operations, controller 108 may interleave the background operations with the foreground operations. In interleaving a background relocation/program operation with a host read operation, controller 108 may consume the time/resources of approximately 33 read operations (i.e., 2000 μs/60 μs=33) for the background program operation. As such, if controller 108 executes one background program operation for each host read operation, the performance of storage device 104 in responding to the host read operation may reduce significantly.

To ensure consistent performance on storage device 104 when responding to host read instructions and executing background operations, controller 108 may translate a background operation load to a page read count. For example, controller 108 may determine that the time needed to execute one background program operation may be equivalent to the time needed to execute 33 page read operations. When controller 108 receives host read data, controller 108 may receive the size of the data to be read in the instructions provided by host 102. Based on the quality of service (QOS) requirement of the host, controller 108 may set up an interleave ratio to interleave an amount of the host read and an amount of the background operation based on operation time. Controller may calculate a quotient by dividing the time required for the host read operations by the time required for a background operation. If the quotient is greater than a preset QoS threshold that meets the QoS of the host requirements, controller 108 may execute the interleave ratio and interleave the host read operations and the background operation, where controller 108 may execute a predefined number of host read operations before executing a background operation. For example, controller 108 may execute 100 pages of host reads before executing a background operation (which may be equivalent to 133 read operations).

If the quotient is less than the preset QoS threshold that meets the QoS of the host requirements, controller 108 may set up another interleave ratio to interleave the host read operations and the background operation based on operation time and recalculate the quotient by dividing the time required for the host read operations by the time required for a background operation. If the quotient is greater than the preset QoS threshold that meets the QoS of the host requirements, controller 108 may execute the interleave ratio and execute a predefined number of host read operations before executing a background operation. As such, even when executing background operations while processing host read data, controller 108 may limit performance degradation and provide consistent read performance. In the example where controller 108 may execute 100 pages of host reads before executing a background operation (100/133=75), controller 108 may provide consistent read performance of at least 75% for host read operations.

Controller 108 may also monitor the temperature of storage device 104 to ensure that the thermal state of storage device 104 is in a normal operation zone. The thermal state of storage device 104 may be dependent on the thermal levels of multiple integrated circuits on storage device 104, the power consumption on storage device 104, the ambient temperature of storage device 104, and/or user requirements. To protect the thermal state of storage device 104, firmware in storage device 104 may periodically measure the temperature using thermal detectors placed at multiple places including, for example, inside controller 108, memory device 110, on the printed circuit board, etc.

Storage device 104 may set a thermal throttling threshold for read operations (a read temperature threshold) to be a higher temperature than a thermal throttling threshold for a programming operation. Storage device 104 may also set the read temperature threshold based on a device specific temperature. For example, controller 108 may set the read temperature threshold depending on a die specific temperature.

When host 102 sends a read operation to storage device 104, host 102 may transmit the size of the read data and set a lower bound for read performance. Host 102 may set a slowdown percentage of the normal read performance for predefined increments in temperature increase. For example, host 102 may set the lower bound for the read performance at 90%, 80%, 70%, 60%, and/or 50% of the normal read performance for every 5° C. temperature increase. Host 102 may monitor read performance within storage device 104 by, for example, calculating the host command turn-around-time, for the data size to be read.

When the temperature of storage device 104 exceeds a predefined temperature threshold due to background program operations, controller 108 may execute a throttling mechanism by either reducing the frequency of the background program operations carried out on storage device 104 or reducing the operational power of components on storage device 104. Controller 108 may also determine when the temperature of storage device 104 exceeds the read temperature threshold and may reduce the read performance by inserting a dummy/empty command between a predefined number of sensing operations. The dummy/empty command may consume less power. In some cases, controller 108 may stop the system clock at these dummy intervals by, for example, placing storage device 104 in an active idle state, with or without a link state slowing down during the idle state. This may reduce the power on storage device 104 and cool down storage device 104 at the dummy intervals.

Controller 108 may monitor the read performance and the temperature of storage device 104 continuously and slow down the read operations as the temperature increases according to the preset slowdown percentage. In some cases, controller 108 may make the read speed temperature dependent. For example, when the temperature on storage device 104 is approaching a predefined temperature threshold (for example, 80° C.), controller 108 may slow down the read speed by a predefined slowdown percentage (for example, 50%). The predefined slowdown percentage may be lower than a thermal throttling percentage (for example, 80%) at which the frequency of operations carried out on storage device 104 may be reduced during thermal throttling. Reducing the read speed to the predefined slowdown percentage may prevent the temperature on storage device 104 from reaching a thermal shutdown temperature threshold. This may in turn prevent controller 108 from executing thermal throttling at the higher thermal throttling percentage which may lead to a higher read performance degradation than the performance degradation that occurs when controller 108 slows down the read speed by the predefined slowdown percentage. Controller 108 may also reduce the read speed to the predefined slowdown percentage for a certain period, for example, for 100 GB of data.

Host 102 may monitor operations, including background operations being carried out on storage device 104. When host 102 transmits read instructions to storage device 104, host may provide the size of the read data. For performance and/or QoS purposes, host 102 may execute a host-SSD protocol, wherein host 102 may instruct storage device 104 to suspend background operations and to execute instructions transmitted from host 102. When storage device 104 receives a suspend instruction from host 102, storage device 104 may suspend background operations and execute host instructions until a predefined resumption condition occurs. For example, storage device 104 may keep track of the number of read errors it encounters while executing host instructions and suspending background operations. When storage device 104 determines that the read error handling count has increased beyond a predefined error handling level (for example, storage device 104 encounters an error condition on 1% of reads), storage device 104 may determine the predefined resumption condition has occurred and transmit a signal to host 102. As part of the signal, storage device 104 may indicate that it may perform background operations with a predefined performance drop (for example, a 5% performance drop) in processing host instructions. In response to the signal, host 102 may issue a resumption instruction to direct storage device 104 to resume background operations to prevent further performance degradation due to excessive error handling on storage device 104.

In some implementations, host 102 may issue the suspend instruction such that storage device 104 may suspend background operations when host 102 issues a foreground instruction with a command including a given data size. This data size may be, for example, based on the needs of host 102, such as if host 102 is retrieving gaming data download/upload, movies download/upload, etc. from storage device 104. Consider an example where host 102 wants to read 128 GB of gaming data from storage device 104 without the read performance on storage device 104 being interrupted by background operations, host 102 may issue the suspend instruction such that storage device 104 may suspend background operations while reading the 128 GB. Alternatively, host 102 may issue a resumption instruction after it receives 128 GB from storage device 104.

In some implementations, host 102 may issue a priority level with foreground instructions based on the importance of the data to be serviced. For example, host 102 may issue a high priority level, a normal priority level, a low priority level, or a no priority level with a foreground instruction. Depending on the priority level, storage device 104 may or may not execute background instructions when executing the foreground instruction. In an example, where host 102 issues a foreground instruction with a high priority level, storage device 104 may suspend background operations while executing the foreground instruction to ensure that foreground instruction is executed without background interruptions, for close to 100% performance.

In another example, where host 102 issues a foreground instruction with a normal priority level, storage device 104 may interleave background instructions with foreground instructions, wherein storage device 104 may execute a predefined number of host read operations before executing a background operation. For example, controller 108 may allow 100 pages of host reads before executing a background operation to limit performance degradation and allow for a first predefined drop of, for example, approximately 25%, in performance. In another example, where host 102 issues a foreground instruction with a low priority level, storage device 104 may interleave background instructions with foreground instructions, wherein storage device 104 may execute a predefined number of host read operations before executing a background operation. For example, controller 108 may use a background operation equation to schedule background operations and allow for a second predefined drop of, for example, approximately 50%, in performance. In an example where host 102 issues a foreground instruction with no priority level, storage device 104 may perform background operation when there is a lull in host activity, or as needed on storage device 104. For example, if the foreground instruction is issued with no priority level, storage device 104 may suspend foreground operations and perform background operations, as determined by storage device 104.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
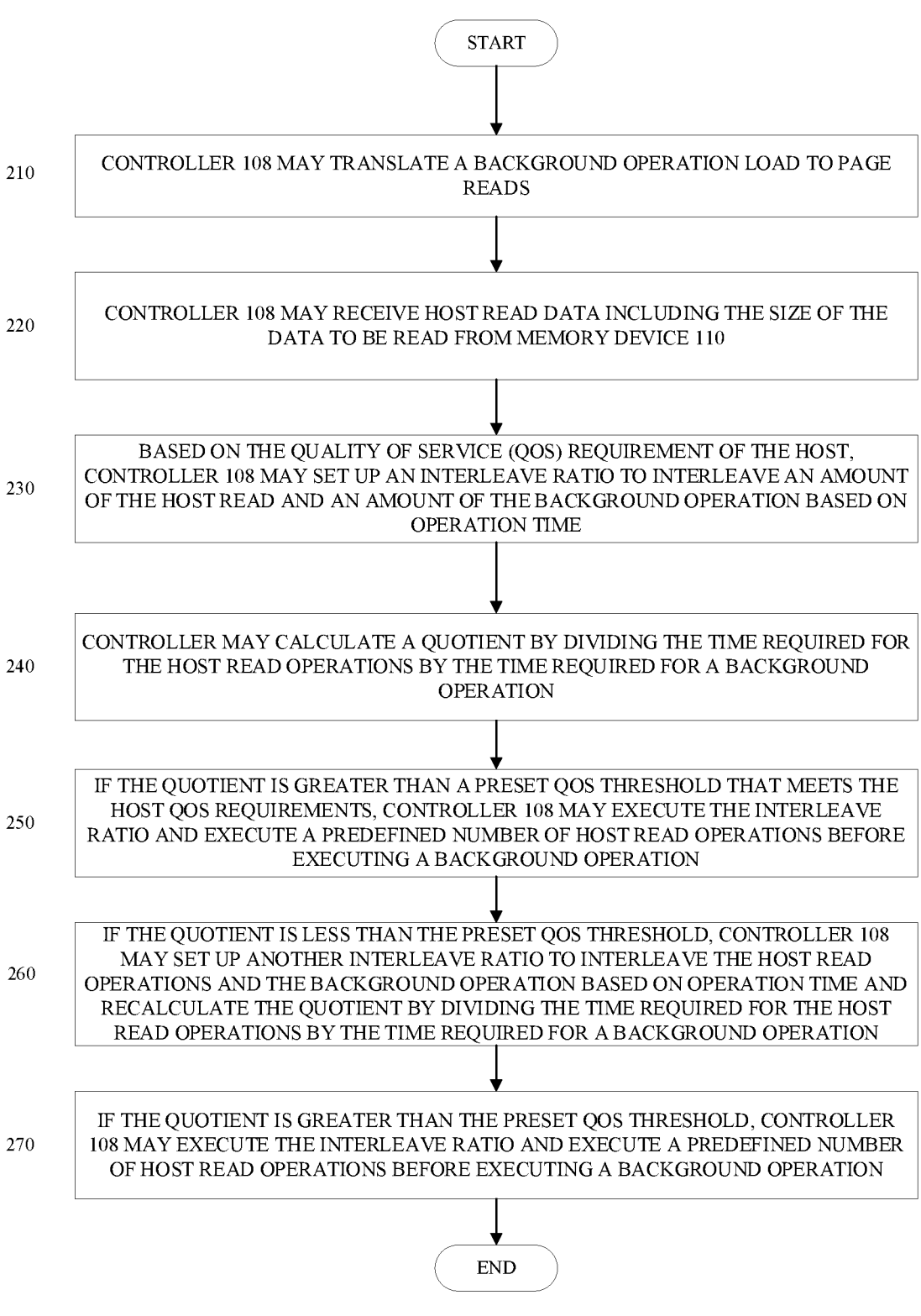
FIG. 2 is a flow diagram of an example process for ensuring consistent performance on a storage device executing a read command in accordance with some implementations.

FIG. 2 is a flow diagram of an example process for ensuring consistent performance on a storage device executing a read command in accordance with some implementations. At 210, controller 108 may translate a background operation load to page reads. At 220, controller 108 may receive host read data including the size of the data to be read from memory device 110. At 230, based on the quality of service (QoS) requirement of the host, controller 108 may set up an interleave ratio to interleave an amount of the host read and an amount of the background operation based on operation time. At 240, controller may calculate a quotient by dividing the time required for the host read operations by the time required for a background operation. At 250, if the quotient is greater than a preset QoS threshold that meets the host QoS requirements, controller 108 may execute the interleave ratio and execute a predefined number of host read operations before executing a background operation.

At 260, if the quotient is less than the preset QoS threshold, controller 108 may set up another interleave ratio to interleave the host read operations and the background operation based on operation time and recalculate the quotient by dividing the time required for the host read operations by the time required for a background operation. At 270, if the quotient is greater than the preset QoS threshold, controller 108 may execute the interleave ratio and execute a predefined number of host read operations before executing a background operation. As indicated above FIG. 2 is provided as an example. Other examples may differ from what is described in FIG. 2.

FIG. 3 is a flow diagram of an example process for ensuring consistent read performance on a storage device implementing thermal throttling in accordance with some implementations. At 310, storage device 104 may set a read temperature threshold to be a higher temperature than a thermal throttling threshold for a programming operation or may set the read temperature threshold to be die-based. At 320, controller 108 may monitor the temperature of storage device 104 to ensure that the thermal state of storage device 104 is in a normal operation zone. At 330, storage device 104 may receive a read command with the size of the read data and one or more slowdown percentages for read performance.

At 340, when the temperature of storage device 104 exceeds a predefined temperature threshold due to background program operations, controller 108 may execute a thermal throttling mechanism by, for example, reducing the frequency of the background program operations carried out on storage device 104 or reducing the operational power of components on storage device 104. At 350, controller 108 may determine when the temperature of storage device 104 exceeds the read temperature threshold and may reduce the read performance by inserting a dummy/empty command between a predefined number of sensing operations. At 360, controller 108 may stop the system clock at these dummy intervals by, for example, placing storage device 104 in an active idle state. At 370, controller 108 may monitor the read performance and the temperature of storage device 104 continuously and slow down the read operations as the temperature increases according to the preset slowdown percentage. As indicated above FIG. 3 is provided as an example. Other examples may differ from what is described in FIG. 3.

Figure 4A:
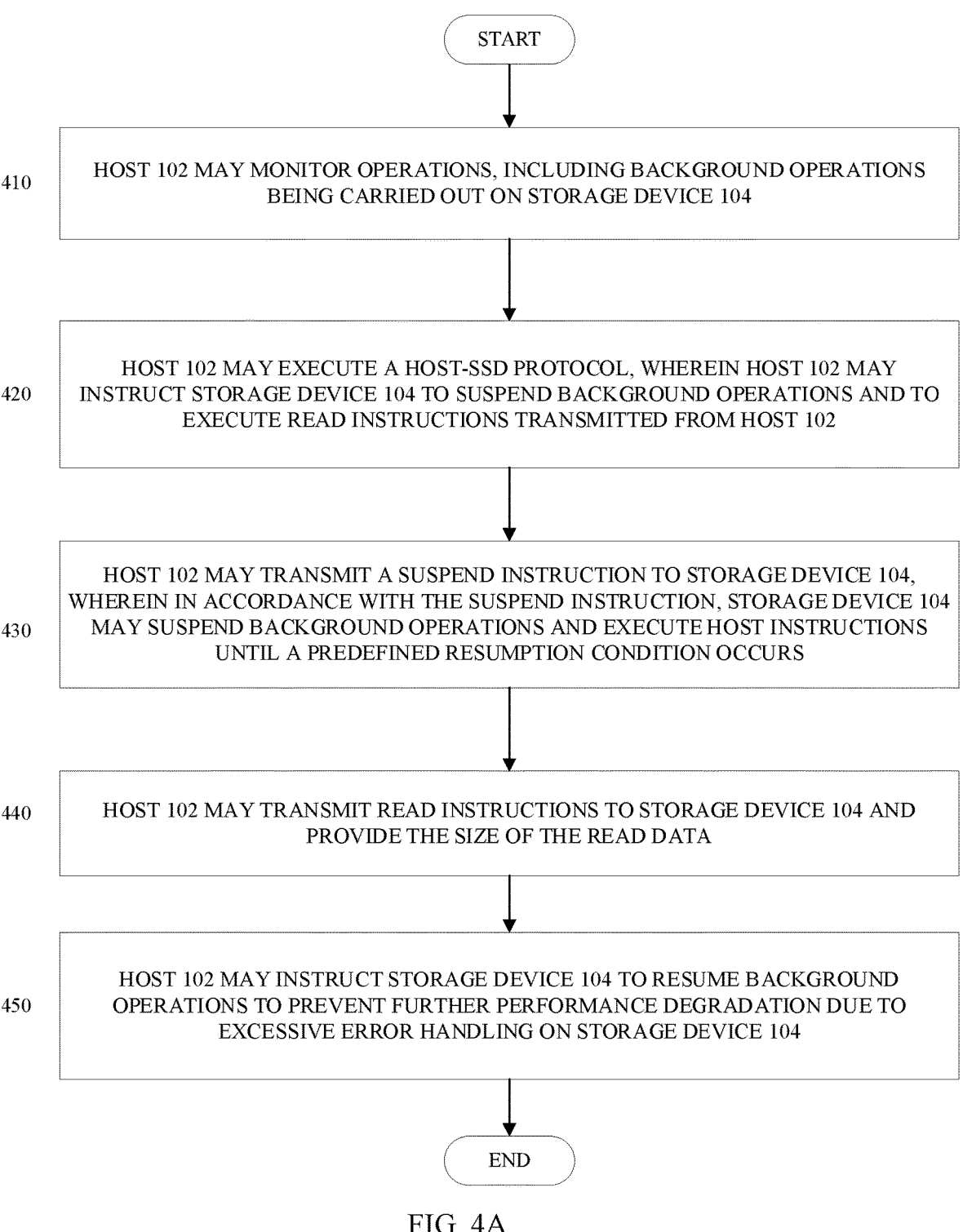

FIG. 4A is a flow diagram of an example process for ensuring consistent read performance by a host device transmitting read instructions to a storage device in accordance with some implementations. At 410, host 102 may monitor operations, including background operations being carried out on storage device 104. At 420, host 102 may execute a host-SSD protocol, wherein host 102 may instruct storage device 104 to suspend background operations and to execute read instructions transmitted from host 102. At 430, host 102 may transmit a suspend instruction to storage device 104, wherein in accordance with the suspend instruction, storage device 104 may suspend background operations and execute host instructions until a predefined resumption condition occurs. At 440, host 102 may transmit read instructions to storage device 104 and provide the size of the read data.

At 450, host 102 may receive an indication from storage device 104 that the resumption condition has occurred. At 460, host 102 may instruct storage device 104 to resume background operations to prevent further performance degradation due to excessive error handling on storage device 104. As indicated above FIG. 4A is provided as an example. Other examples may differ from what is described in FIG. 4A.

Figure 4B:
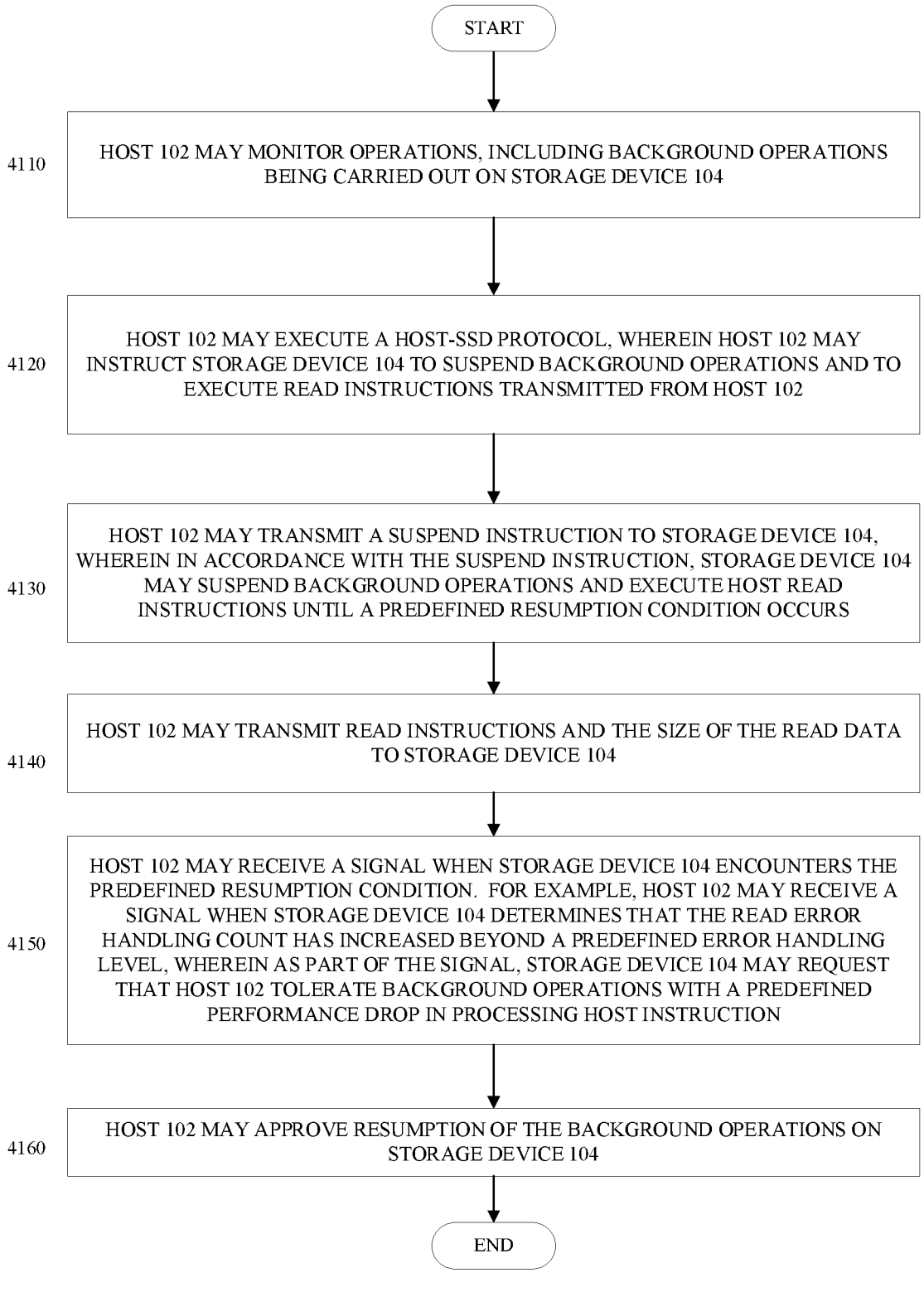

FIG. 4B is a flow diagram of another example process for ensuring consistent read performance by a host device transmitting read instructions to a storage device in accordance with some implementations. At 4110, host 102 may monitor operations, including background operations being carried out on storage device 104. At 4120, host 102 may execute a host-SSD protocol, wherein host 102 may instruct storage device 104 to suspend background operations and to execute read instructions transmitted from host 102.

At 4130, host 102 may transmit a suspend instruction to storage device 104, wherein in accordance with the suspend instruction, storage device 104 may suspend background operations and execute host read instructions until a predefined resumption condition occur. At 4140, host 102 may transmit read instructions and the size of the read data to storage device 104.

At 4150, host 102 may receive a signal when storage device 104 encounters the predefined resumption condition. For example, host 102 may receive a signal when storage device 104 determines that the read error handling count has increased beyond a predefined error handling level. As part of the signal, storage device 104 may request that host 102 tolerate background operations with a predefined performance drop in processing host instructions. At 4160, host 102 may approve resumption of the background operations on storage device 104. As indicated above FIG. 4B is provided as an example. Other examples may differ from what is described in FIG. 4B.

FIG. 4C is a flow diagram of another example process for ensuring consistent read performance by a host device transmitting read instructions to a storage device based on the importance of the data to be serviced in accordance with some implementations. At 4210, host 102 may monitor operations, including background operations being carried out on storage device 104. At 4220, based on the importance of data to be serviced, host 102 may issue a priority level with the read instructions wherein depending on the priority level, storage device 104 may or may not execute background instructions when executing the read instructions.

At 4230, host 102 may issue a foreground instruction with a high priority level, wherein storage device 104 may suspend background operations while executing the foreground instruction. At 4240, host 102 may issue a foreground instruction with a normal priority level, wherein storage device 104 may interleave background instructions with foreground instructions by executing a predefined number of host read operations before executing a background operation to limit performance degradation and allow for a first predefined performance drop. At 4250, host 102 may issue a foreground instruction with a low priority level, wherein storage device 104 may interleave background instructions with foreground instructions, by executing a predefined number of host read operations before executing a background operation to limit performance degradation and allow for a second predefined performance drop. At 4260, host 102 may issue a foreground instruction with no priority level, wherein storage device 104 may perform background operation when there is a lull in host activity, or as needed on storage device 104. As indicated above FIG. 4C is provided as an example. Other examples may differ from what is described in FIG. 4C.

Figure 5:
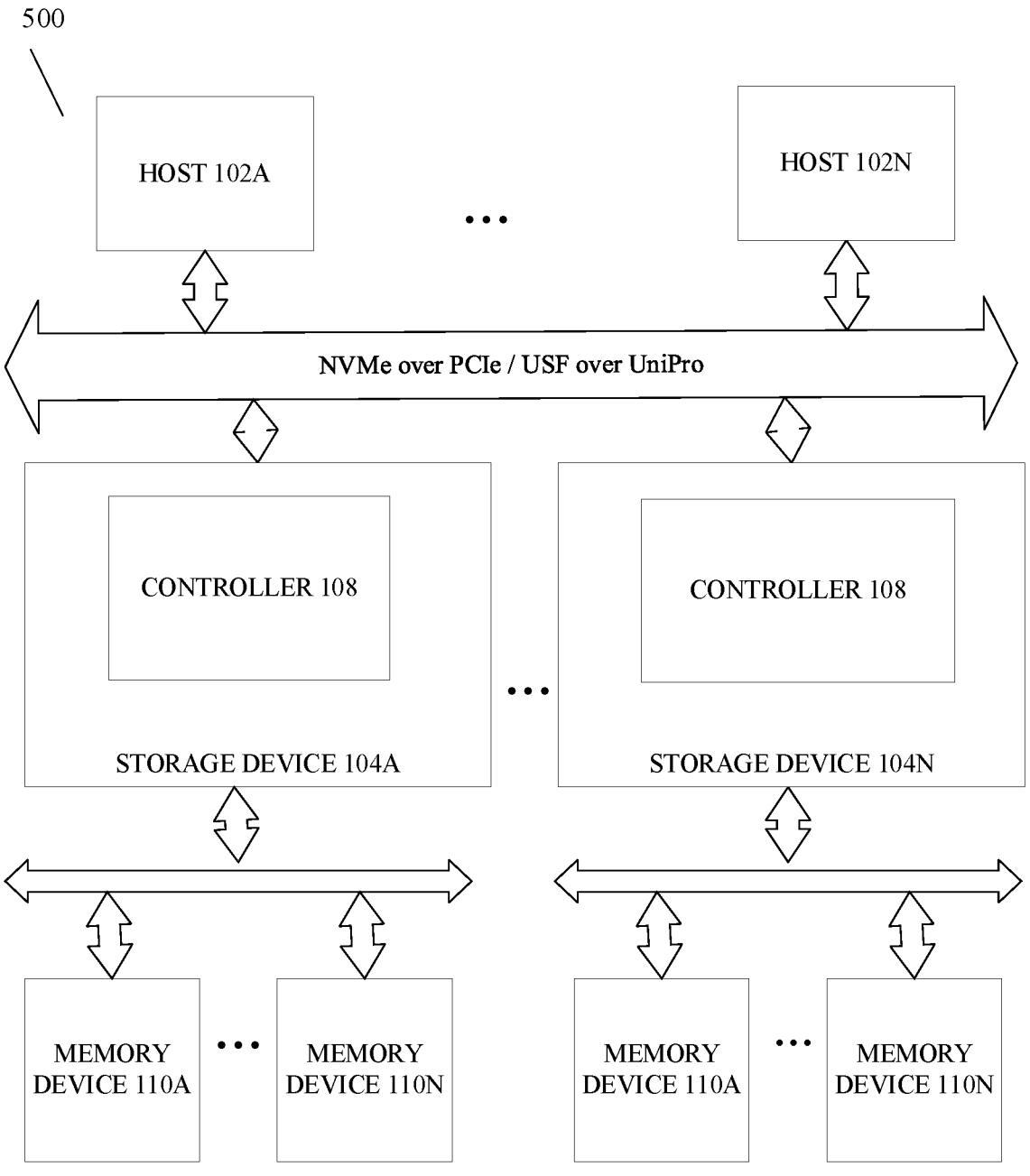
FIG. 5 is a diagram of an example environment in which systems and/or methods described herein are implemented.

FIG. 5 is a diagram of an example environment in which systems and/or methods described herein are implemented. As shown in FIG. 5, Environment 500 may include hosts 102-102n (referred to herein as host(s) 102), and storage devices 104a-104n (referred to herein as storage device(s) 104).

Storage device 104 may include a controller 108 to manage the resources on storage device 104. Controller 108 may ensure consistent performance on storage device 104 when executing a read command. Controller 108 may also ensure consistent read performance on storage device 104 implementing thermal throttling. Host 102 may further ensure consistent read performance by storage device 104 when host device 102 transmits read instructions to storage device 104. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 500 may interconnect via wired connections, wireless connections, or a combination of wired and wireless connections. For example, the network of FIG. 5 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of Environment 500 may perform one or more functions described as being performed by another set of devices of Environment 500.

Figure 6:
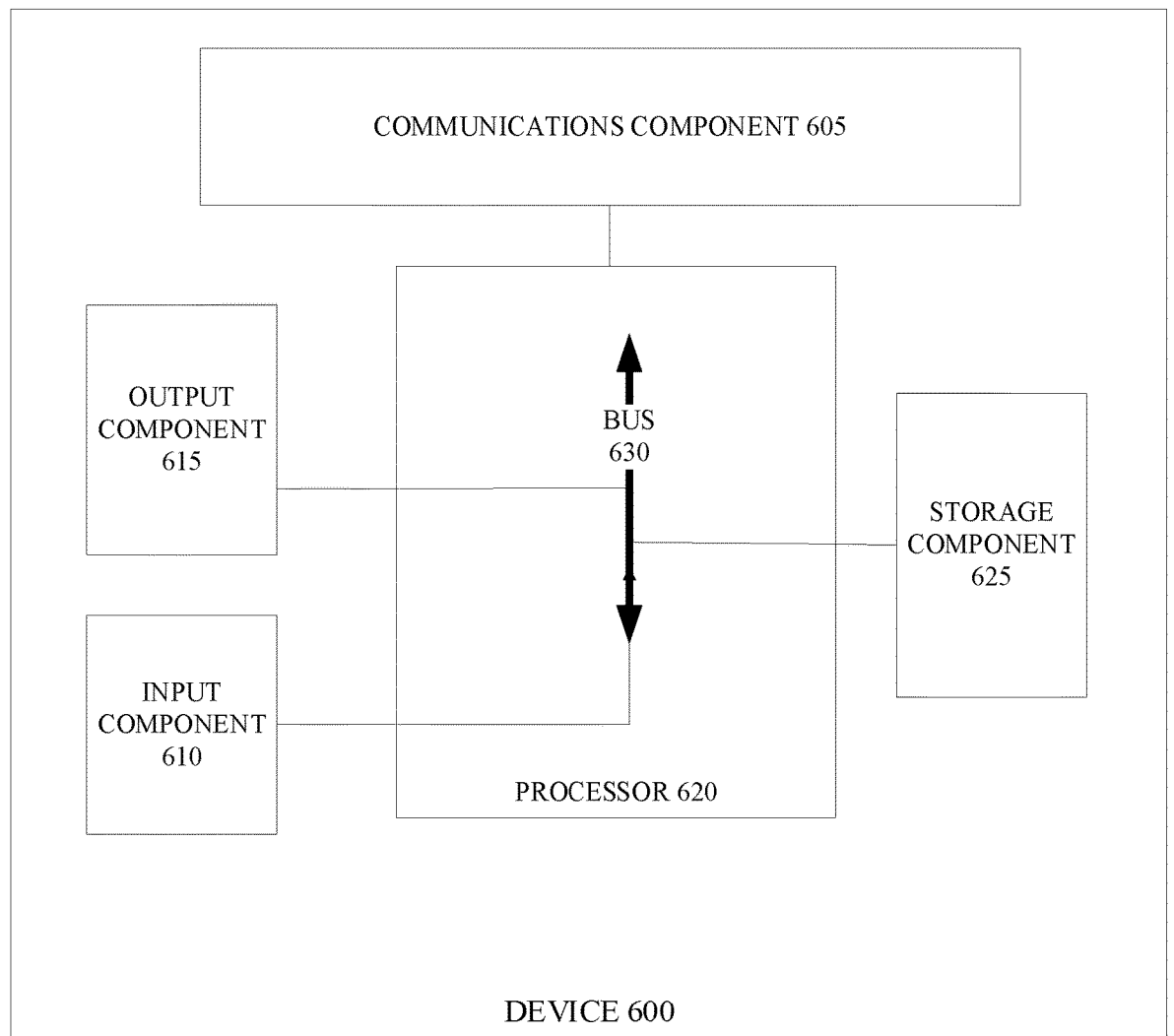
FIG. 6 is a diagram of example components of the host of FIG. 1.

FIG. 6 is a diagram of example components of one or more devices of FIG. 1. In some implementations, host 102 may include one or more devices 600 and/or one or more components of device 600. Device 600 may include, for example, a communications component 605, an input component 610, an output component 615, a processor 620, a storage component 625, and a bus 630. Bus 630 may include components that enable communication among multiple components of device 600, wherein components of device 600 may be coupled to be in communication with other components of device 600 via bus 630.

Input component 610 may include components that permit device 600 to receive information via user input (e.g., keypad, a keyboard, a mouse, a pointing device, a microphone, and/or a display screen), and/or components that permit device 600 to determine the location or other sensor information (e.g., an accelerometer, a gyroscope, an actuator, another type of positional or environmental sensor). Output component 615 may include components that provide output information from device 600 (e.g., a speaker, display screen, and/or the like). Input component 610 and output component 615 may also be coupled to be in communication with processor 620.

Processor 620 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 may include one or more processors capable of being programmed to perform a function. Processor 620 may be implemented in hardware, firmware, and/or a combination of hardware and software.

Storage component 625 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 620. A memory device may include memory space within a single physical storage device or memory space spread across multiple physical storage devices. Storage component 625 may also store information and/or software related to the operation and use of device 600. For example, storage component 625 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 605 may include a transceiver-like component that enables device 600 to communicate with other devices, such as via a wired connection, a wireless connection, or a combination of wired and wireless connections. The communications component 605 may permit device 600 to receive information from another device and/or provide information to another device. For example, communications component 605 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 605 may also include one or more broadband and/or narrowband transceivers and/or other similar types of wireless transceiver configurable to communicate via a wireless network for infrastructure communications. Communications component 605 may also include one or more local area network or personal area network transceivers, such as a Wi-Fi transceiver or a Bluetooth transceiver.

Device 600 may perform one or more processes described herein. For example, device 600 may perform these processes based on processor 620 executing software instructions stored by a non-transitory computer-readable medium, such as storage component 625. As used herein, the term "computer-readable medium" refers to a non-transitory memory device. Software instructions may be read into storage component 625 from another computer-readable medium or from another device via communications component 605. When executed, software instructions stored in storage component 625 may cause processor 620 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to ensure consistent performance when executing a read command provided by a host device that is communicatively coupled to the storage device, the storage device also being communicatively coupled to a memory device including data in the read command, the storage device comprising:

a controller to:

execute a read instruction received by the storage device;

execute a background operation to at least one of manage resources on the memory device and perform thermal throttling on the storage device; and one of a) execute a formula including an interleave ratio to interleave host read operations with the background operation based on an operation time and b) optimize the host read operations during the thermal throttling and limit performance degradation during read operations using one of i) a read temperature threshold, ii) a preset slowdown percentage, and a iii) read speed, wherein in executing the background operation, the controller monitors a temperature of the storage device and in optimizing the host read operations during thermal throttling, the controller sets the read temperature threshold to be one of higher than a thermal throttling threshold for a programming operation and to be based on a device specific temperature.

2. The storage device of claim 1, wherein in executing the formula, the controller:

translates a background operation load to a page read count;

sets up the interleave ratio to interleave an amount of host read data with an amount of the background operation;

calculates a quotient of a time used for the host read operations divided by a time used for the background operation;

compares the quotient with a quality-of-service threshold; and depending on a comparison, executes the interleave ratio by executing a predefined number of the host read operations before executing the background operation.

3. The storage device of claim 1, wherein in optimizing the host read operations during thermal throttling, the controller determines that a temperature of the storage device exceeds the read temperature threshold and reduces read performance by inserting a dummy command between a predefined number of sensing operations.

4. The storage device of claim 1, wherein the controller stops a system clock at intervals including the dummy command and places the storage device in an active idle state.

5. The storage device of claim 1, wherein in optimizing the host read operations during thermal throttling, the controller monitors read performance on the storage device and a temperature of the storage device and slows down the read operations as the temperature increases according to the preset slowdown percentage.

6. The storage device of claim 1, wherein in optimizing the host read operations during thermal throttling, the controller monitors read performance on the storage device and a temperature of the storage device and at least one of makes the read speed dependent on the temperature of the storage device and reduces the read speed for a certain period.

7. A method to ensure consistent performance when executing a read command provided by a host device that is communicatively coupled to a storage device, the storage device being communicatively coupled to a memory device including data in the read command, the method comprises:

executing a read instruction received by the storage device from the host device;

executing, by the storage device, a background operation to at least one of manage resources on the memory device and perform thermal throttling on the storage device; and one of:

executing, by the storage device, a formula including an interleave ratio to interleave host read operations with the background operation based on an operation time, and optimizing the host read operations during the thermal throttling and limiting performance degradation during read operations using one of a read temperature threshold, a preset slowdown percentage, and a read speed, wherein in executing the background operation, the method further comprises monitoring the temperature of the storage device and in optimizing the host read operations during thermal throttling, the method comprises setting the read temperature threshold to be one of higher than a thermal throttling threshold for a programming operation and to be based on a device specific temperature.

8. The method of claim 7, wherein executing the formula comprises:

translating a background operation load to a page read count;

setting up the interleave ratio to interleave an amount of host read data with an amount of the background operation based on an operation time;

calculating a quotient of a time used for the host read operations divided by a time used for the background operation;

comparing the quotient with a quality-of-service threshold; and depending on a comparison, executing the interleave ratio by executing a predefined number of the host read operations before executing the background operation.

9. The method of claim 7, wherein in optimizing the host read operations during thermal throttling, the method comprises determining that a temperature of the storage device exceeds the read temperature threshold and reducing read performance by inserting a dummy command between a predefined number of sensing operations.

10. The method of claim 9, further comprising stopping a system clock at intervals including the dummy command and placing the storage device in an active idle state.

11. The method of claim 7, wherein in optimizing the host read operations during thermal throttling, the method further comprises monitoring read performance on the storage device and the temperature of the storage device, and at least one of slowing down the read operations as the temperature increases according to the preset slowdown percentage, making the read speed dependent on a temperature of the storage device, and reducing the read speed for a certain period.

12. The method of claim 7, wherein in optimizing the host read operations during thermal throttling the method comprises:

receiving a read instruction from the host, wherein the host monitors operations, being carried out on the storage device;

receiving an instruction from the host to suspend background operations and to execute the read instruction;

suspending the background operation until a predefined resumption condition occurs;

transmitting a signal to the host when the resumption condition occurs; and resuming processing the background operation based on a resumption instruction from the host.

13. The method of claim 12, wherein the predefined resumption condition includes determining that an error handling count is higher than a predefined error handling level.

* * * * *